W. FARQUHARSON.
DRILL CHUCK.
APPLICATION FILED NOV. 10, 1914.

1,154,299.

Patented Sept. 21, 1915.

WITNESSES
Cornelius Hoving
John H. Hoving

INVENTOR
WILLIAM FARQUHARSON
By H. van Oldenheel
ATTORNEY

UNITED STATES PATENT OFFICE.

WILLIAM FARQUHARSON, OF GREENOCK, SCOTLAND.

DRILL-CHUCK.

1,154,299.

Specification of Letters Patent.

Patented Sept. 21, 1915.

Application filed November 10, 1914. Serial No. 871,249.

*To all whom it may concern:*

Be it known that I, WILLIAM FARQUHARSON, a subject of the King of the United Kingdom of Great Britain and Ireland, and residing at Greenock, Renfrewshire, Scotland, have invented a certain new and useful Improvement in Drill-Chucks, of which the following is a specification.

This invention relates to drill chucks.

Broadly stated, the present invention consists in an improved construction wherein the drill or drill holder is subject to engagement on three surfaces by three coaxial segmental pads, such engagement on three surfaces insuring accurate centering. The use of pads which permit of tri-facial contact adds greatly to the life of the device, it having been experienced that the use of spherical pads which engage the drill at points only means more or less rapid wear.

A drill chuck embodying the invention is illustrated in the accompanying drawing in which—

Figure 1:
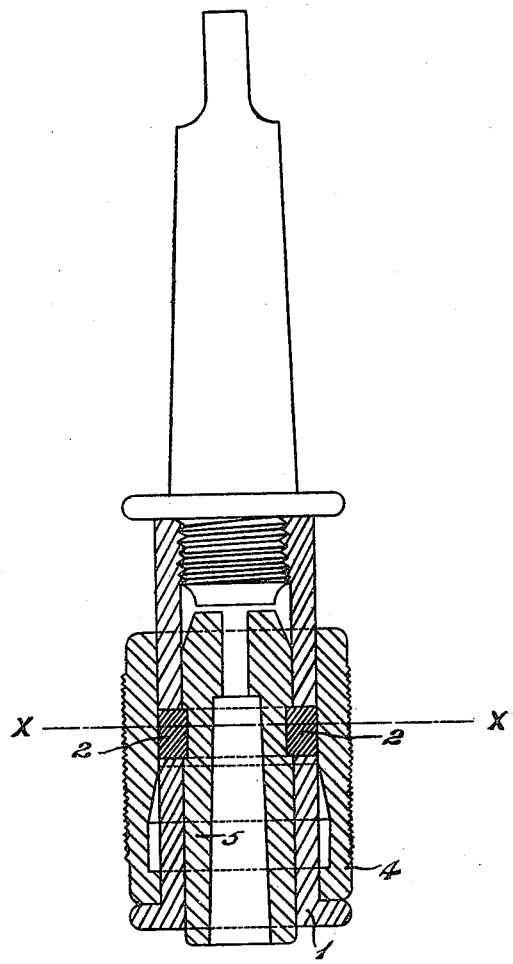
Figure 2:
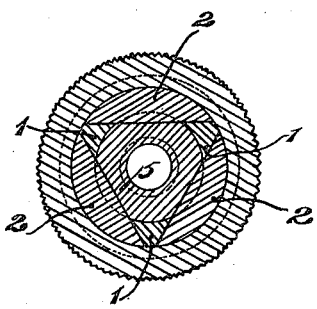

Figure 1 is a longitudinal section and Fig. 2 a cross section on the line X—X, Fig. 1.

As shown, the chuck comprises a tubular element 1 adapted to receive a drill holder or drill and formed with three peripheral openings angularly spaced 120° apart and each entered by a pad 2, each pad engaging a correspondingly shaped flat formed on the drill holder 5 or drill. The said element 1 is surrounded by a sleeve 4 capable of telescoping thereon, the internal peripheral surface of said sleeve being adapted to engage the external cylindrical surface of the pads 2. The internal cylindrical surface of said sleeve is partly conical so that, as the said sleeve is slid along the tubular element 1, the pads are caused to engage and disengage the drill holder. It will be appreciated that by virtue of this construction the drill holder or drill is subject to trilateral engagement which results in accurate centering and the distribution of the stress imparted to the holder or shank of the drill over its entire circumference.

It will be seen that the drill holder 5 is held against both axial and rotary movement relatively to the tubular element 1 exclusively by the pads.

I claim:—

In a drill chuck, in combination, a tubular element adapted to receive a drill or drill holder provided on its external periphery with three flats, said tubular element formed with three openings, three coaxial segmental pads each fitting an opening in said element and each in surface engagement with a flat, the drill or drill holder being held against both rotary and axial movement relatively to said element exclusively by said pads, and a sleeve surrounding said tubular element and capable of telescoping in relation to said element into and out of engagement with said pads, substantially as and for the purpose set forth.

In testimony whereof I have signed my name to this specification in the presence of two subscribing witnesses.

WILLIAM FARQUHARSON.

Witnesses:
 WALLACE CRANSTON FAIRWEATHER,
 DOUGLAS KEITH FAIRWEATHER.

Copies of this patent may be obtained for five cents each, by addressing the "Commissioner of Patents, Washington, D. C."